United States Patent
Cockayne et al.

(10) Patent No.: US 10,642,931 B1
(45) Date of Patent: May 5, 2020

(54) SYSTEMS AND METHODS FOR PRODUCING MORE MEANINGFUL WEB SERVICES DESCRIPTIONS VIA AUTOMATED CROSS-REFERENCE OF EXTERNAL INFORMATION SOURCES

(71) Applicant: CA, Inc., Islandia, NY (US)

(72) Inventors: Simon Cockayne, Charlottesville, VA (US); Raghunath Daita, Hyderabad (IN)

(73) Assignee: CA, Inc., New York, NY (US)

( * ) Notice: Subject to any disclaimer, the term of this patent is extended or adjusted under 35 U.S.C. 154(b) by 965 days.

(21) Appl. No.: 13/927,801

(22) Filed: Jun. 26, 2013

(51) Int. Cl.
*G06F 17/27* (2006.01)

(52) U.S. Cl.
CPC ............... *G06F 17/2705* (2013.01)

(58) Field of Classification Search
CPC ............ G06F 17/2247; G06F 17/2705; G06F 17/272; G06F 17/30864; G06F 17/3089
USPC ........................................ 707/755
See application file for complete search history.

(56) References Cited

U.S. PATENT DOCUMENTS

| | | | | |
|---|---|---|---|---|
| 6,304,877 B1* | 10/2001 | LeBlanc | ............ | H04L 12/24 |
| 7,487,513 B1* | 2/2009 | Savchenko et al. | .......... | 719/320 |
| 7,725,590 B2* | 5/2010 | Sedukhin | .............. | 709/230 |
| 7,822,826 B1* | 10/2010 | Savchenko et al. | .......... | 709/217 |
| 7,822,840 B2* | 10/2010 | Chen | ................... | G06F 9/54 709/203 |
| 2005/0021689 A1* | 1/2005 | Marvin | ............... | G06F 8/31 709/220 |
| 2005/0091386 A1* | 4/2005 | Kuno | .............. | G06F 17/30566 709/228 |
| 2007/0061018 A1* | 3/2007 | Callaghan et al. | ............ | 700/1 |
| 2008/0271047 A1* | 10/2008 | Rafnsson | ............ | G06F 17/243 719/311 |
| 2009/0106350 A1* | 4/2009 | Chen | ................... | G06F 9/54 709/203 |
| 2009/0138561 A1* | 5/2009 | Bahrs et al. | ............ | 709/206 |
| 2011/0302239 A1* | 12/2011 | Grateau et al. | ............ | 709/203 |

OTHER PUBLICATIONS

Matthew Morris, "CA 2E Web Service WSDL", Desynit, Jul. 5, 2011, http://www.desynit.com/News/Blog/tabid/93/PostID/28/CA-2E-Web-Service-WSDL.aspx accessed May 7, 2013, 3 pages.

Simon Cockayne, "Developing Web Services With CA 2E r8.5", CA, Inc., Sep. 24, 2009, http://www.plex2e.com/downloads/7B%20-%20Developing%20Web%20Services%20with%20CA%202E%20r8.5.pdf accessed May 7, 2013.

\* cited by examiner

*Primary Examiner* — Michael Pham

(57) ABSTRACT

In a method for generating narrative interface descriptions, a file including a machine-readable description of a computing interface is parsed to identify an element therein based on a property thereof. Cross-reference data including human-readable narrative information corresponding to the element is retrieved from a data source, and an embellished file is generated in which the element is modified to include the cross-reference data. Related methods, systems, and computer program products are also discussed.

20 Claims, 10 Drawing Sheets

SYSTEMS AND METHODS FOR PRODUCING MORE MEANINGFUL WEB SERVICES DESCRIPTIONS VIA AUTOMATED CROSS-REFERENCE OF EXTERNAL INFORMATION SOURCES

BACKGROUND

The present disclosure relates to computing systems, and more specifically, to computing platforms to provide web services.

Cloud computing refers to the use of computing resources (hardware and software) that are delivered as a service over a network (typically the Internet). Cloud computing entrusts remote services with a user's data, software and computation.

The Web Services Description Language (WSDL) is an XML-based interface description language that may be used to describe the type and/or structure of elements a web service. In particular, a WSDL description of a web service (also referred to as a WSDL file) may provide a machine-readable description of the interface for the web service, including how the web service can be called, what parameters it may expect, and what data structures it may return. It can thus serve a purpose similar to that of a method signature in a programming language.

WSDL may thus be used to define the interface to web service operation(s) and may be used by a developer to assist in the creation of a web service client, to help ensure that accurate information is passed to the web service operation from the client and back from the web service operation to the client.

BRIEF SUMMARY

Systems, methods, and computer program products for providing narrative or otherwise meaningful computing interface descriptions are disclosed.

According to an embodiment described herein, in a method for generating narrative interface descriptions, a file comprising a machine-readable description of a computing interface is parsed to identify an element therein based on a property thereof. Cross-reference data comprising human-readable narrative information corresponding to the element is retrieved from a data source, and an embellished file is generated in which the element is modified to include the cross-reference data. The parsing, the retrieving, and the generating are performed by at least one processor.

In an embodiment, the file may be a Web Services Description Language (WSDL) file comprising a plurality of network endpoints that define a web service.

In an embodiment, the file may be an extensible markup language (XML) based file, using a non-WSDL standard, but which may comprise a plurality of network endpoints that define a web service.

In an embodiment, the file may be an artifact, such as an XML-based file, which may be used to help generate a WSDL file. The embellishments in such an artifact can be carried through to the WSDL file. In other words, the file to be embellished may include a WSDL file, or an artifact that may be used to generate the WSDL, and the generated WSDL file can be embellished.

In an embodiment, a change to the data source wherein the cross-reference data is updated may be identified. The retrieving the cross-reference data and the generating the embellished file may be repeated responsive to identifying the change to the data source. In particular, updated cross-reference data may be retrieved from the data source responsive to identifying the change therein, and an updated embellished file may be generated in which the element is further modified to include the updated cross-reference data.

In an embodiment, the element may include content and markup information, the property may be indicated by the markup information, and the content may be modified to include the cross-reference data in the embellished file. For example, the element may be identified and/or the cross-reference data may be retrieved based on a descriptive tag included in the element.

In an embodiment, the content may include a string of characters that is meaningless in a human readable format, and the cross-reference data may include a string of characters having a corresponding meaning in the human-readable format.

In an embodiment, the data source may be external to a computing device including the processor therein. An identification of the data source may be received, and the cross-reference data may be retrieved from the data source based on the property indicated by the markup information for the element responsive to receiving the identification of the data source.

In an embodiment, in parsing the file, a control file for the computing interface may be accessed. The control file may include the markup information stored therein. The element may be identified based on the property indicated by the markup information stored in the control file.

In an embodiment, in generating the embellished file, the content of the element may be modified to include the cross-reference data comprising the human-readable narrative information while retaining an integrity (e.g., maintaining a type, order, and/or structure) of the machine-readable description of the computing service. For example, the element may include a programmatically assigned name, and the programmatically assigned name may be replaced with the cross-reference data from the data source in generating the embellished file. Also, a field name of the file may be replaced with the cross-reference data. In addition, the cross-reference data may be appended to the content of the element between pre-existing start and end tags thereof in generating the embellished file.

In an embodiment, in parsing the file, a plurality of elements in the machine-readable description of the computing interface may be identified based on respective properties thereof and the elements may be stored in a first data structure. In retrieving the cross-reference data, respective cross-reference data comprising human-readable narrative information corresponding to each of the elements may be retrieved, and the respective cross-reference data may be stored in a second data structure. In generating the embellished file, the first data structure may be cross-referenced with the second data structure to determine a one-to-one relation between the elements of the first data structure and the respective cross-reference data of the second data structure based on the respective properties of the elements, and each of the elements may be modified to include the respective cross-reference data based on the one-to-one relation. As such, a number of input/output operations may be reduced.

It is noted that aspects described with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1B:
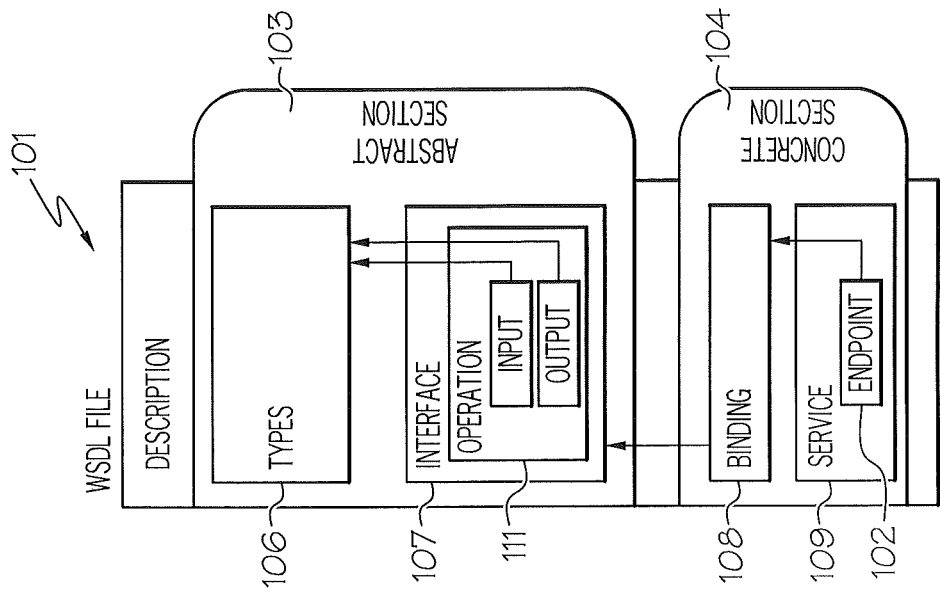
FIG. 1B is a block diagram illustrating the structure of a WSDL file or document in accordance with some embodiments of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As described herein, a computing system or platform may include one or more hosts, operating systems, peripherals, and/or applications. Machines in a same computing system or environment may have shared memory or resources, may be associated with the same or different hardware platforms, and/or may be located in the same or different physical locations. Computing systems described herein may refer to a virtualized environment (such as a cloud environment) and/or a physical environment.

A web service can refer to a software system designed to support interoperable machine-to-machine interaction over a network, and may have a computing interface described in a machine-readable/-processable format (for example, WSDL). Other systems may interact with the web service in a manner prescribed by its description using messages, such as Simple Object Access Protocol (SOAP) messages, typically conveyed using Hypertext Transport Protocol (HTTP) with an Extensible Markup Language (XML) serialization in conjunction with other Web-related standards. As such, web services can provide a standard for interoperating between different software applications running on a variety of platforms and/or frameworks.

The characters making up WSDL file or document as described herein may define markup and content, which may be distinguished by the application of simple syntactic rules. For example, character strings that constitute markup may begin with the character "<" and end with a ">", or may begin with the character "&" and end with a ";". A tag may refer to a markup construct that begins with < and ends with >. An attribute may refer to a markup construct consisting of a name/value pair that exists within a start-tag or empty-element tag. Strings of characters that are not markup may be referred to as content. An element may refer to a logical document component which either begins with a start-tag and ends with a matching end-tag or consists only of an empty-element tag. The characters between the start- and end-tags may be referred to as the element's content, and may contain markup, including other elements, which may be referred to as child elements.

As described herein, a description of a web service interface or other computing interface may refer to a file (such as a .wsdl file, also referred to herein as a WSDL file) and/or an artifact that may be used to develop and/or otherwise generate the file (such as a .pcml file, also referred to herein as a PCML file). As described herein, an "artifact" may generally refer to an input that is used to build/generate a WSDL file or other description of a web service, as illustrated for instance in FIG. 5, block 500. For instance, a PCML file would be an example of an artifact that is used to generate a WSDL file. The description may be provided in a machine-readable format, for example, using a markup language. Narrative information for an element of such a file/artifact may include a descriptive name for the element, documentation describing a purpose or function of the element or file, documentation defining values of the element, and/or other information that may be meaningful to a developer of a web client for the web service. The narrative information may be provided in a human-readable format.

Some embodiments of the present disclosure may arise from realization that, while a WSDL file (whether manually created or programmatically generated) may often include sufficient information to describe the type and structure required for interaction with a web service, less or no emphasis may be given to the explanation of the purpose of a given element in the file. For example, an element name may include a string of characters that is not meaningful in a human-readable format, and/or a WSDL file (or artifact used to generate the WSDL file) may lack narrative documentation, such as valid values and their meanings. Consequently, the developer of a web service client may expend additional time and effort deriving or determining the purpose and/or meaning of an element or operation (and/or how to use it) from other sources, such as from conversation with the web service publisher, and/or from documentation pertaining to the application behind the web service.

Embodiments of the present disclosure may help to mitigate or preclude such additional investigative work by the web service client developer to determine the purpose of elements or operations, by automatically or programmatically generating web service interface descriptions that contain rich narrative information about the purpose of elements and operations. In particular, embodiments of the present disclosure may be used to generate web service description files (for example, in WSDL) that contain more narrative or otherwise meaningful element names, operation names, and/or explanation of purpose, which can be more useful to a developer that is trying to build a web service client for the operation(s) described. A WSDL file that contains sufficient narrative information to clearly explain the purpose of an element or operation may reduce or mitigate the need for the web service client developer to spend time and effort deriving information from other sources.

Moreover, should the purpose of an element or operation change, the WSDL file may be re-generated to reflect the changes when an information source is updated with the new purpose by repeating the analysis and cross-referencing of the updated information sources as described herein. The change detection mechanism could be manual or automatic. For example, in manual change detection, the owner of the Web Service/WSDL/Artifact or the External information source(s) may be responsible for identifying changes that warrant re-embellishment of a web service. In basic automatic change detection, the external information source and/or WSDL/Artifact may be under a change management (CM) system, and changes to the information may be communicated to the Web Service owner, who may determine if embellishment is required. In advanced automatic change detection, the CM system may be configured to identify changes to the information source/WSDL/Artifact that had been used in embellishment, e.g., the embellishment process could "tag" or store a reference between pertinent section of information source and the Artifact/WSDL, which can help filter change detection notifications to the web service owner.

Figure 1A:
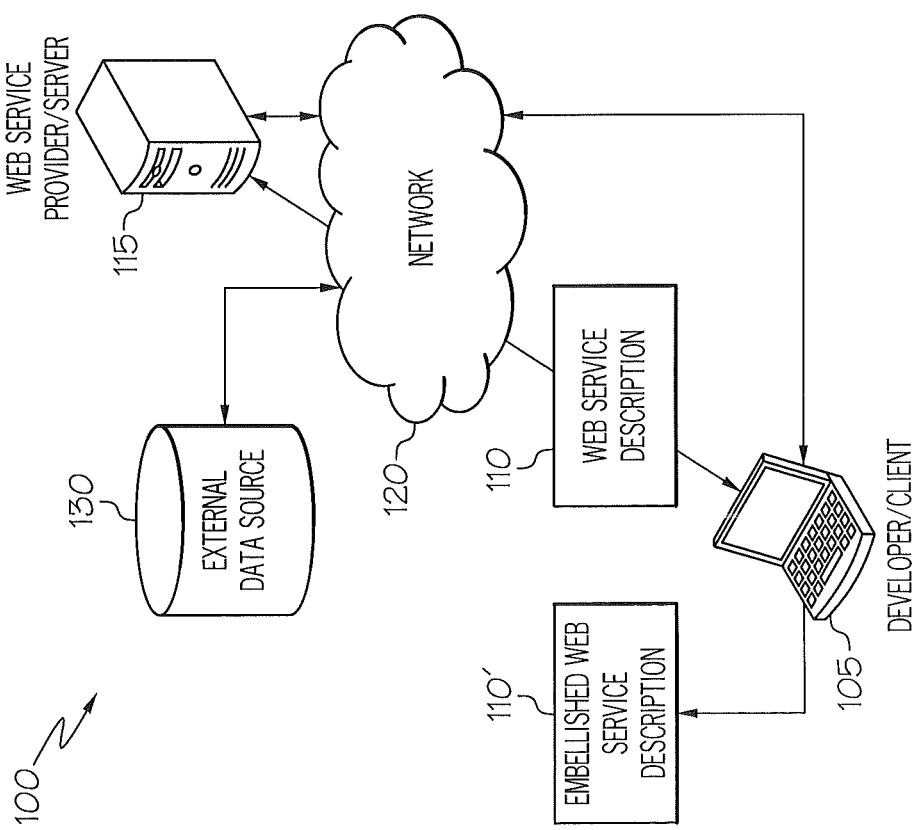
FIG. 1A is a block diagram of a computing system or environment for generating narrative web service interface descriptions in accordance with some embodiments of the present disclosure.

FIG. 1A illustrates a computing system or environment 100 for generating narrative web service interface descriptions in accordance with some embodiments of the present disclosure. Referring now to FIG. 1A, the computing system 100 includes one or more client devices (illustrated as a developer device 105) that is coupled to one or more server devices (illustrated as a web service provider 115) via a network 120. The client(s) 105 can also access and/or communicate with one or more data sources 130 that are external to the client(s), such as an external database, via the network 120. The external data source(s) 130 may be known to or specified by the developer/client 105, by the web service provider/server 115, and/or by one or more other network devices in the system 100. The network 120 may be a global network, such as the Internet or other publicly accessible network. Various elements of the network 120 may be interconnected by a wide area network, a local area network, an Intranet, and/or other private network, which may not be accessible by the general public. Thus, the communication network 120 may represent a combination of public and private networks or a virtual private network (VPN). The network 120 may be a wireless network, a wireline network, or may be a combination of both wireless and wireline networks.

The client 105 and server 115 can communicate via the network 120 using a standard communications mode or protocol, such as Hypertext Transport Protocol (HTTP), SOAP, XML-RPC, and/or WSDL. According to the HTTP request-response communications model, HTTP requests for service are sent from the client 105 to the server 115, and HTTP responses are sent from the server 115 to the client 105 in response to an HTTP requests. It will be appreciated that in accordance with various embodiments of the present disclosure, the web service provider 115 may be implemented as a single server, separate servers, or a network of servers either co-located in a server farm, for example, or located in different geographic regions. In general, the client/server environment maintains a distinction between client and server processes, although client and server processes may operate on different machines or on the same machine.

In operation, the web service provider 115 provides a web service description 110 (such as a WSDL file or document) to the client 105. The web service description 110 includes machine-readable data describing the computing interface for the web service, including how the service provided by the web service provider 115 can be called, as well as expected parameters to be received by and data structures to be returned from the web services provider 115.

FIG. 1B illustrates the structure of an example WSDL file or document. As shown in FIG. 1B, a WSDL file 101 may describe services as collections of network endpoints, or ports 102. The WSDL specification may provide an XML format for documents for this purpose. In particular, the WSDL file 101 may include an abstract section 103 including abstract definitions or descriptions of the types of data being exchanged 106 and interfaces or port types 107, which include abstract collections of supported operations 111. The WSDL file 101 may further include a separate concrete section 104, which defines ports or endpoints 102 by associating a network address with a reusable binding 108, where the collection of ports or endpoints 102 defines a service 109. The reusable binding 108 may include the concrete protocol and data format specifications for a particular port type or interface 107, such that the operations 111 may be bound to a concrete network protocol and data format. The abstract definitions of interfaces or port types 103 may be separated from their concrete uses or instances 104, allowing the reuse of the concrete definitions.

Referring again to FIG. 1A, the web service description 110 received at the client device 105 may lack narrative information as to the elements and/or values included therein. As such, some embodiments of the present disclosure may parse the received web service description 110 to identify such elements, retrieve cross-reference data including narrative information corresponding to the identified elements from the external data source(s) 130, and modify the identified elements using the retrieved cross-reference data to generate an embellished web service description 110'. The embellished web service description 110' may include the narrative information in a human-readable format, and may thereby provide more meaningful information to the developer 105 with regard to the identified element(s), while maintaining the integrity (including the type, order, and structure) of the original web services description 110.

Although FIGS. 1A and 1B illustrate an example system and WSDL file for generating narrative web service interface descriptions, it will be understood that embodiments of the present disclosure are not limited to such configurations, but are intended to encompass any configuration capable of carrying out the operations described herein.

Figure 2:
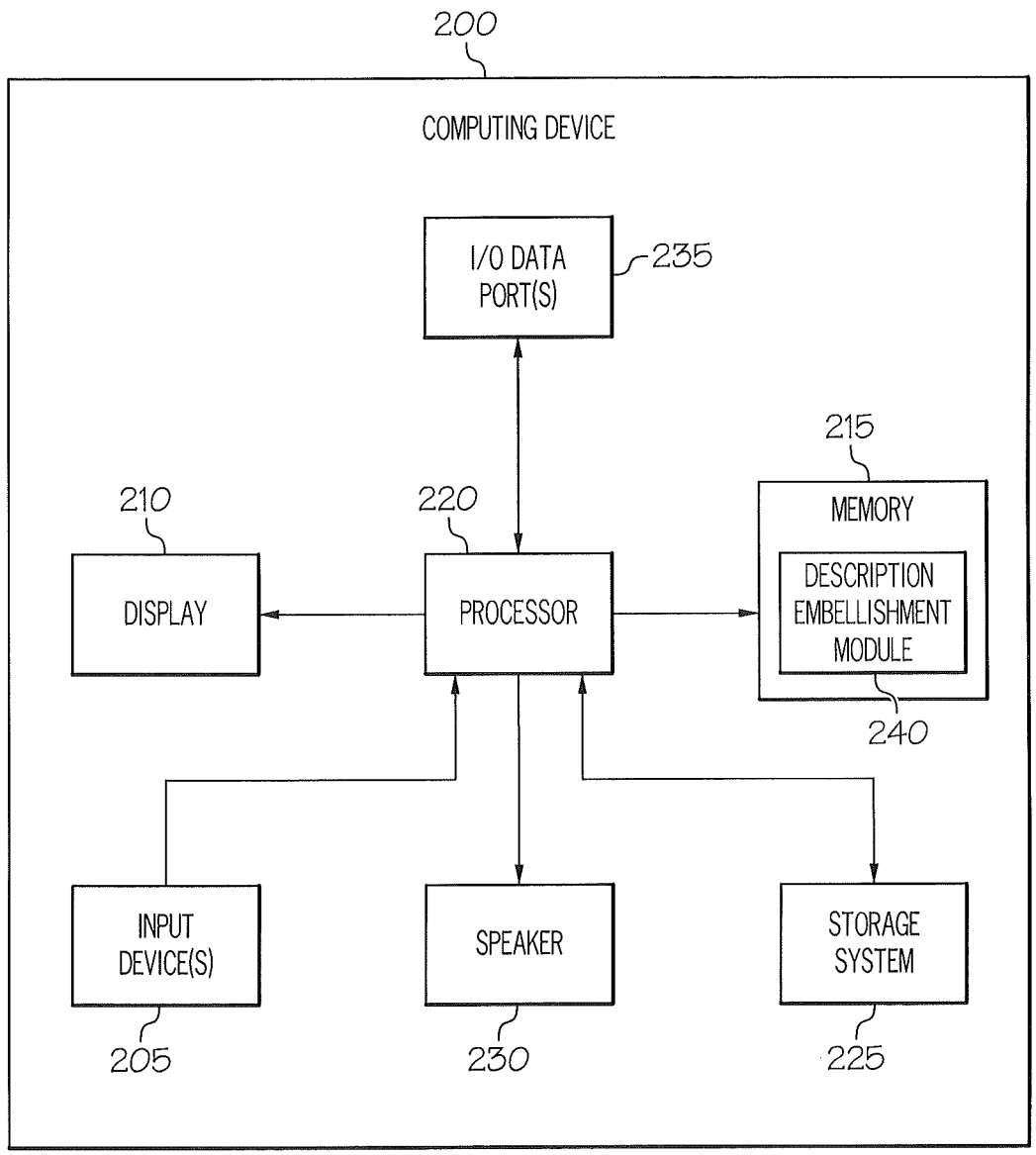
FIG. 2 is a block diagram that illustrates computing device for generating narrative web service interface descriptions in accordance with some embodiments of the present disclosure

FIG. 2 illustrates an example computing device 200 including a description embellishment module 240 for generating narrative web service interface descriptions in accordance with some embodiments of the present disclosure. The device 200 may be used, for example, to implement one or more of the client(s) 105 and the server(s) 115 in the system 100 of FIG. 1 using hardware, software implemented with hardware, firmware, tangible computer-readable storage media having instructions stored thereon, or a combination thereof, and may be implemented in one or more computer systems or other processing systems. The computing device 200 may also be a virtualized instance of a computer. As such, the devices and methods described herein may be embodied in any combination of hardware and software.

As shown in FIG. 2, the computing device 200 includes input device(s) 205, such as a keyboard or keypad, a display 210, and a memory 215 that communicate with one or more processors 220. The computing device 200 may further include a storage system 225, a speaker 230, and an I/O data port(s) 235 that also communicate with the processor 220. The memory 215 may be configured with a description embellishment module 240 that may be used to parse an input file including a description of a web service interface to identify one or more elements for embellishment, retrieve cross-reference data corresponding to the element(s), and generate an embellished output file including additional narrative information for the element(s) as described in greater detail herein.

The storage system 225 may include removable and/or fixed non-volatile memory devices (such as but not limited to a hard disk drive, flash memory, and/or like devices that may store computer program instructions and data on computer-readable media), volatile memory devices (such as but not limited to random access memory), as well as virtual storage (such as but not limited to a RAM disk). The input/output (I/O) data port(s) 235 may include a communication interface and may be used to transfer information in the form of signals between the computing device 200 and another computer system or a network (e.g., the Internet). The communication interface may include a modem, a network interface (such as an Ethernet card), a communications port, a PCMCIA slot and card, or the like. These components may be conventional components, such as those used in many conventional computing devices, and their functionality, with respect to conventional operations, is generally known to those skilled in the art. Communication infrastructure between the components of FIG. 2 may include one or more device interconnection buses such as Ethernet, Peripheral Component Interconnect (PCI), and the like.

Figure 3:
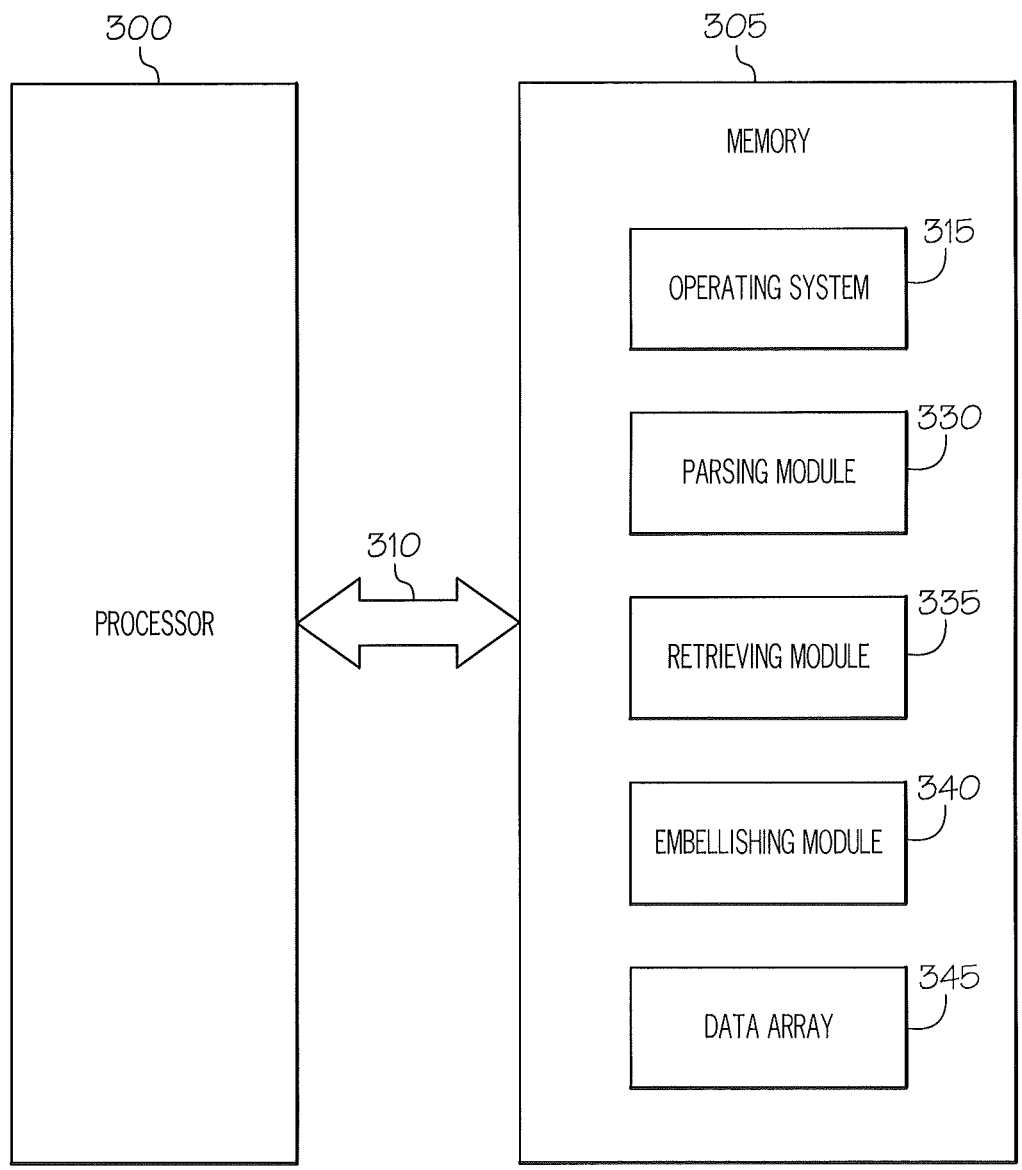
FIG. 3 is a block diagram that illustrates a software/hardware architecture for generating narrative web service interface descriptions in accordance with some embodiments of the present disclosure.

FIG. 3 illustrates a processor 300 and memory 305 that may be used in computing devices or other data processing systems, such as the computing device 200 of FIG. 2, for generating more narrative web service descriptions in accordance with some embodiments of the present disclosure. The processor 300 communicates with the memory 305 via an address/data bus 310. The processor 300 may be, for example, a commercially available or custom microprocessor, including, but not limited to, digital signal processor (DSP), field programmable gate array (FPGA), application specific integrated circuit (ASIC), and multi-core processors. The memory 305 is representative of the one or more memory devices containing the software and data used to retrieve information from a webpage in accordance with some embodiments of the present invention. The memory 305 may include, but is not limited to, the following types of devices: cache, ROM, PROM, EPROM, EEPROM, flash, SRAM, and DRAM.

As shown in FIG. 3, the memory 305 may contain multiple categories of software and/or data, including: an operating system 315, a parsing module 330, a retrieving module 335, a cross-reference data structure (such as an array 345), and an embellishing module 340. The operating system 315 generally controls the operation of the computing device or data processing system. In particular, the operating system 315 may manage software and/or hardware resources and may coordinate execution of programs by the processor 300. In some embodiments of the present disclosure, parsing module 330 is configured to parse or analyze information in a generated WSDL file (and/or in artifacts used to generate the WSDL file) to identify one or more elements to be embellished, retrieving module 335 is configured to cross-reference the identified element(s) of the WSDL file (or artifacts thereof) against other specified external data sources to retrieve cross-reference data including narrative information corresponding to the identified element(s), and embellishing module 340 is configured to replace or embellish the identified element(s) based on the cross-reference data to generate an embellished WSDL file including information in a human-readable format that may be more meaningful and/or more useful WSDL file for a user or developer. The cross-reference data may be retrieved from software data models or repositories, comments or tags that describe fields or parameters in the business logic or algorithms used to implement the web service, and/or application documentation stored in the external data sources. In some embodiments, the retrieving module 335 may store the retrieved cross-reference data in the data array 345.

Although FIG. 3 illustrates exemplary hardware/software architectures that may be used in data processing systems, such as the computing device 200 of FIG. 2, for generating more narrative web service descriptions, it will be understood that the present invention is not limited to such a configuration but is intended to encompass any configuration capable of carrying out operations described herein. Moreover, the functionality of the computing device 200 of FIG. 2 and the hardware/software architecture of FIG. 3 may be implemented as a single processor system, a multi-processor system, a processing system with one or more cores, a distributed processing system, or even a network of stand-alone computer systems, in accordance with various embodiments.

Computer program code for carrying out the operations discussed above with respect to FIG. 3 may be written in a high-level programming language, such as COBOL, Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Figure 4:
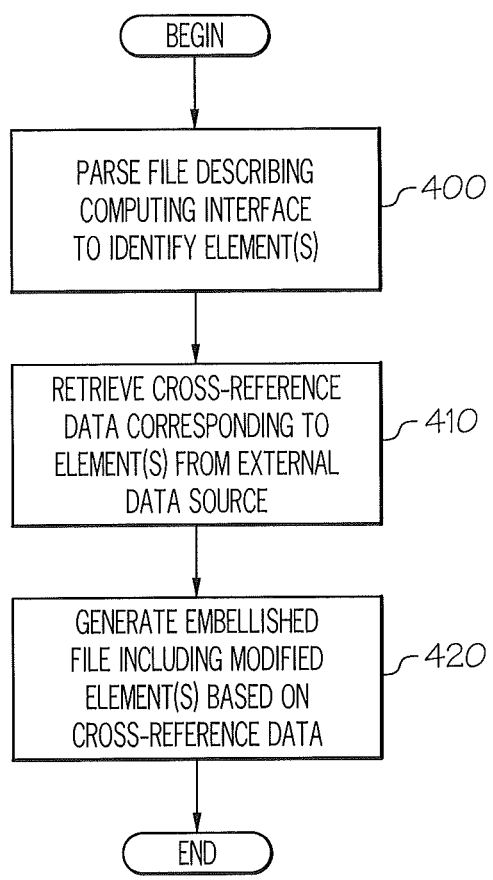
FIGS. 4, 5A, 5B, 5C, 6A, 6B, and 6C are flowcharts that illustrate operations for generating narrative web service interface descriptions in accordance with some embodiments of the present disclosure.

Operations for generating more narrative web service descriptions in accordance with some embodiments of the present disclosure will now be described with reference to the flowcharts of FIGS. 4, 5A, 5B, 5C, 6A, 6B, and 6C. Referring now to FIG. 4, operations begin at block 400 where a file is parsed to identify at least one element therein based on a property thereof. The file may include a description of a web service interface (such as a WSDL file) or other computing interface, and/or may include an artifact that is used to build or generate a WSDL file (for example, a PCML file or other XML-type structures). The element(s) may be defined in a machine readable-format. The content of the element(s) may include character strings that do not have corresponding meaning in a human-readable format. The element(s) may be identified based on a particular type, markup (e.g., tag and/or attribute), content, and/or other property thereof. At block 410, cross-reference data corresponding to the identified element(s) is retrieved from data source. The cross-reference data may include narrative information in a human-readable format describing the element(s) and/or the content thereof, such as meaningful name(s) for the respective element(s) and/or a description of the functionality or purpose of the input file and/or web service. An embellished file (in which the identified element(s) and/or content thereof are modified based on the cross-reference data) is thereby generated at block 420. For example, in the embellished file, the content of the identified element(s) of the original file may be replaced with the corresponding retrieved cross-reference data, and/or the retrieved cross-reference data may be appended to the existing content of the identified element(s). However, the embellished file may retain the type, order, or structure of the original file, such that the integrity of the original file is not altered. The embellished output file may thus include additional narrative information as to the purpose of the element(s) and/or the web service that may be understood by a user, while maintaining the integrity of the original input file.

Figure 5A:
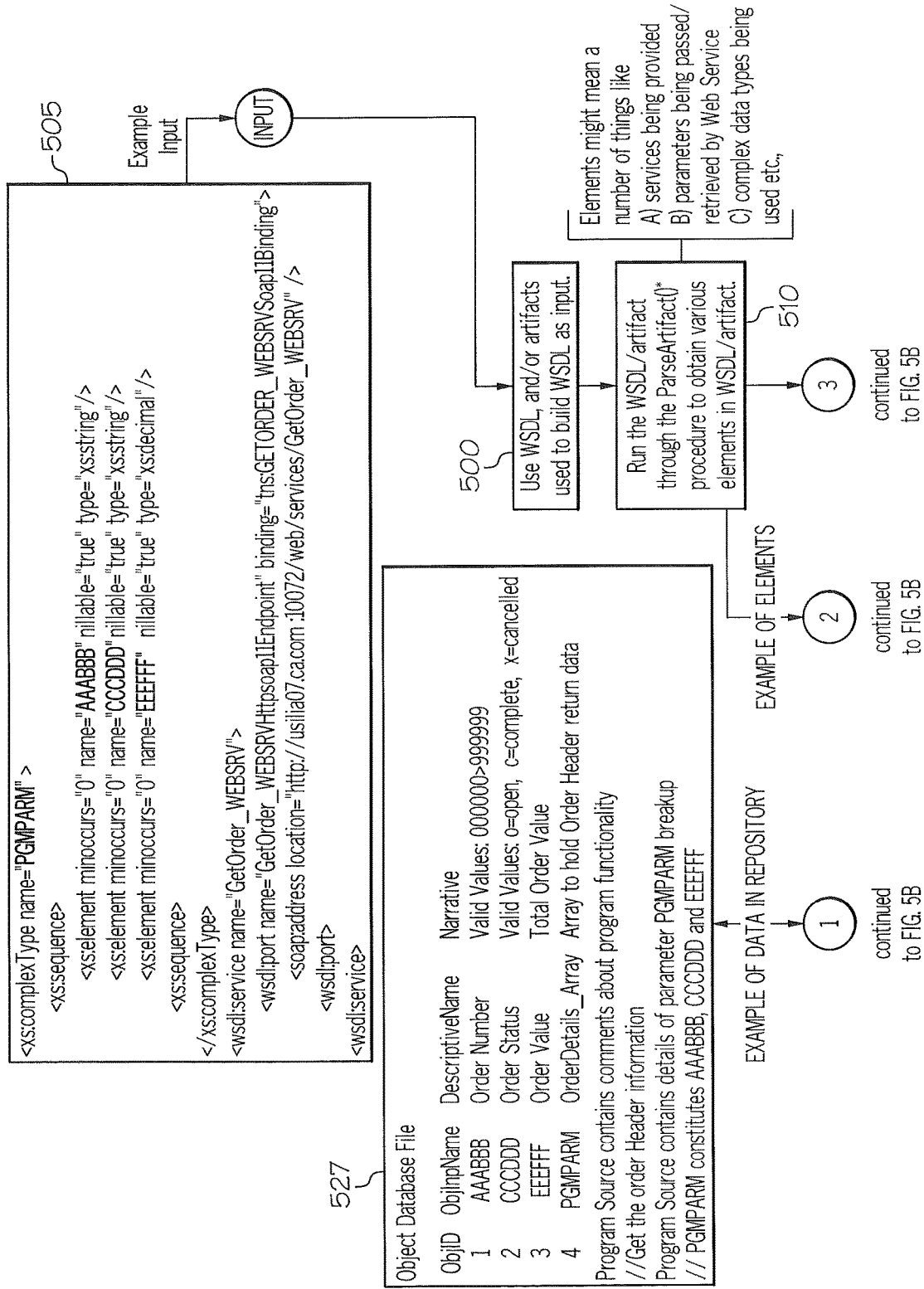
Figure 5B:
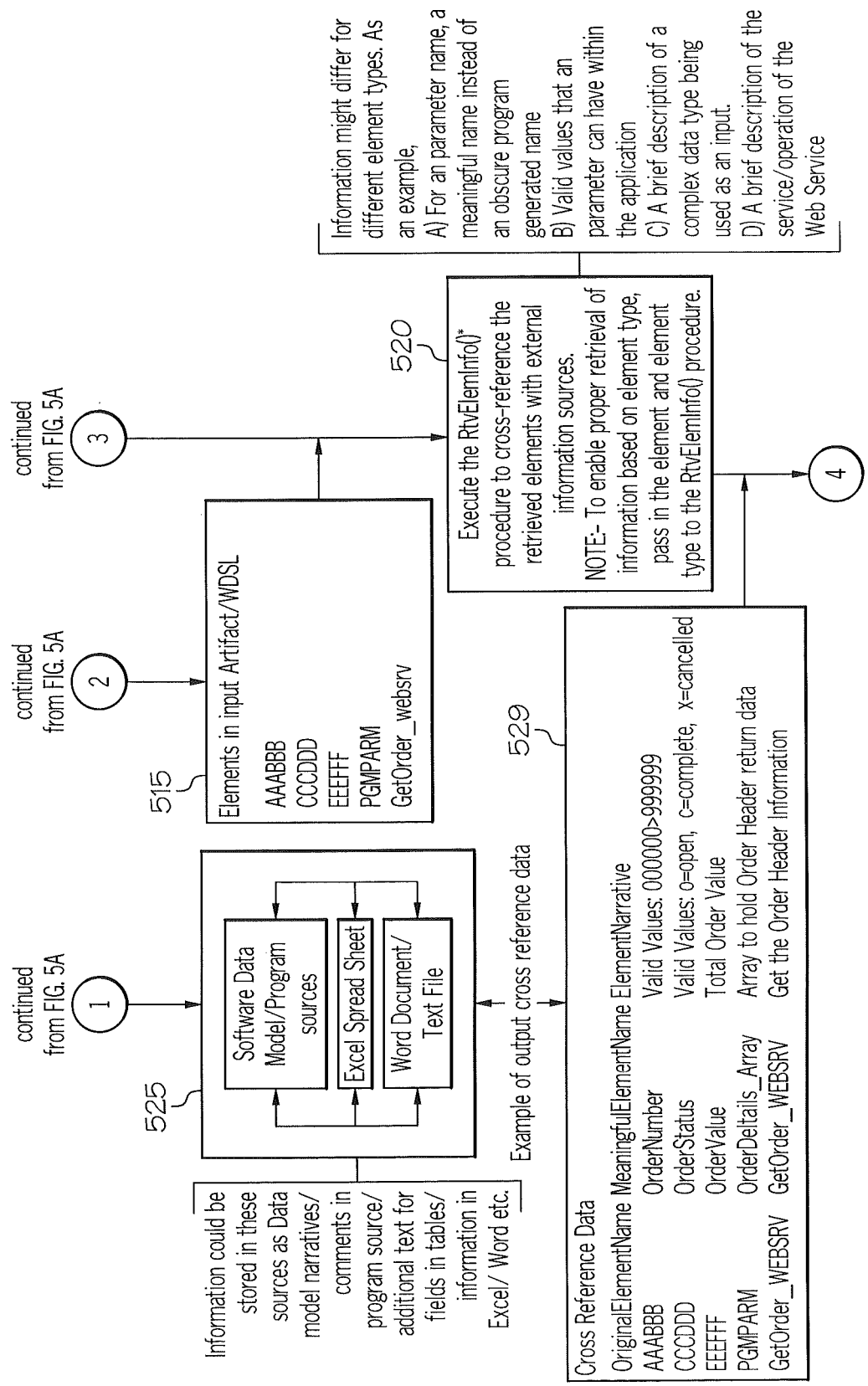
Figure 5C:
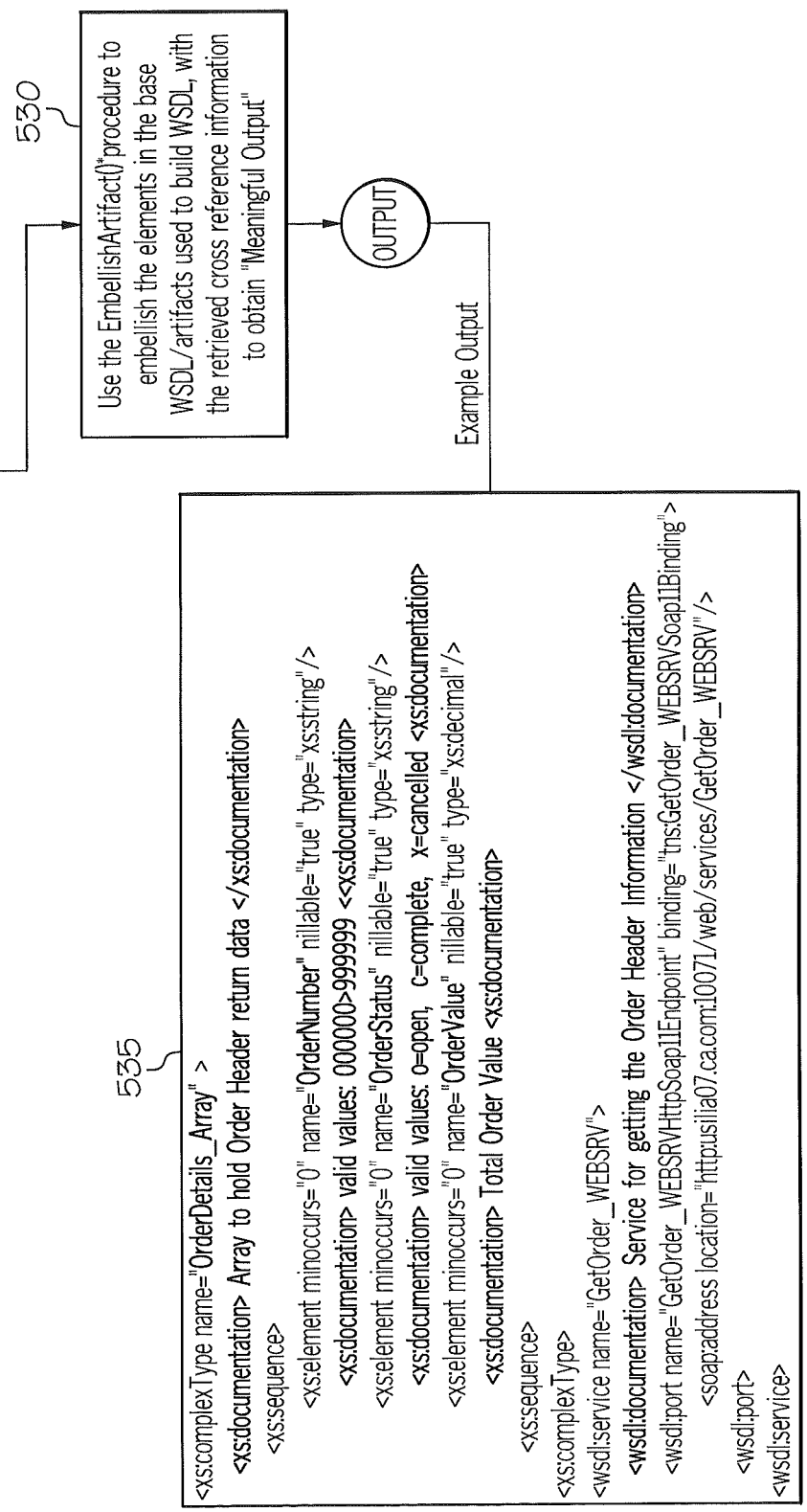

FIGS. 5A-C are flowcharts illustrating operations for generating more narrative web service descriptions in accordance with some embodiments of the present disclosure in greater detail. Referring now to FIGS. 5A-C, an initial or raw machine-readable input file describing a computing interface (such as a WSDL file and/or artifact(s) thereof) is received at block 500. An example of an initial WSDL input file is shown in block 505. A parsing operation (for example, as performed by the parsing module 330 of FIG. 3) is executed using the received WSDL file and/or artifact(s) to identify and/or otherwise obtain various elements therein based on respective properties thereof at block 510. The elements may include content in the form of strings of characters (such as Unicode characters) representing, for example, services to be provided, parameters to be passed/retrieved by the web service, and/or complex data types to be used when interfacing with the web service. The character strings may not have a meaning or may be otherwise unintelligible in a human-readable format. For example, as shown in block 515, the identified elements include the element names "AAABBB", "CCCDDD," "EEEFFF", and "PGMPARM", and the service name "GetOrder_websrv" as parsed from the initial input file shown in block 505. Element type, markup data (including tags, attributes, etc.), and/or other properties may be used to identify these elements.

At block 520, a retrieving operation (for example, as performed by the retrieving module 335 of FIG. 3) is executed to retrieve cross-reference data corresponding to the identified elements from one or more information sources that are external to a user/developer/client. In some embodiments, for retrieval of information based on element type, the element and element type may be provided as inputs to the retrieving operation. The cross-reference data may include narrative information in a human-readable format describing the element, the file, and/or the artifact thereof, and may differ for different element types. For example, for a parameter name, a meaningful or descriptive name may be retrieved to replace a more obscure or meaningless program-generated name. In addition, the cross-reference data may include valid values for a parameter within an application. The cross-reference data may also include a description of a complex data type used in the input file, and/or a description of a service/operation corresponding to the Web service. The name(s) and/or location(s) of the external data/information source(s) may be user-specified and/or otherwise made known to the user/developer/client.

The information identifying the external data source(s) (which are queried when a WSDL file is to be processed for embellishment) can be specified in multiple ways. For example, the name(s) and/or location(s) of the external data source(s) can be specified manually by the user/developer/client. Additionally or alternatively, the external data source(s) can be entered into a configurations file that lists or otherwise includes the name, location, and/or order in which the data source(s) should be queried, if more than one data source exists. The information in the external data source(s) can be received from many sources. For instance, the information can be created as part of database design process, as part of technical specifications process, and/or in an entity-relationship data/software data model that may be used, as well as from any product/tool related documentation (PDF's, Word, Excel spreadsheets, Internet/Intranet web pages etc) and/or program sources.

The cross-reference data can thus be retrieved from various information stored in the external information sources. For example, as shown in block 525, the external information sources may store software data model/program sources, spreadsheets, and/or text files, and the cross-reference data may be retrieved from model narratives/comments in the program sources, text for fields in tables, information in Excel/Word files, etc. An example of data stored in an external repository (including elements/character strings, corresponding descriptive names, and other corresponding narrative information such as valid values) is illustrated in block 527, and an example of the retrieved cross-reference data stored in an array (relating the elements/strings to the descriptive names and other narrative information) is illustrated at block 529. The retrieved cross-reference data may be stored in the array 345 of the memory 305 of FIG. 3, or in another memory and/or another data structure. More generally, while described herein with reference to the storing of data in an array, it will be understood that embodiments of the present invention are not limited thereto, and the data described herein may be stored in any other type of data structure that may be used to represent the data, such as a list, stack, etc.

Based on the retrieved cross-reference data, an embellishing operation (for example, as performed by the embellishing module 340 of FIG. 3) is executed at block 530 to embellish the elements in the received input file with additional narrative information, thereby generating an output file including descriptions of the web service and/or elements thereof in a human-readable format, which may be more meaningful to a user or developer than the initial raw input file. As shown in block 535, an example of an embellished output WSDL file replaces the element names "AAABBB", "CCCDDD", "EEEFFF", and "PGMPARM" (parsed from the initial input WSDL file shown in block 505) with the retrieved descriptive names "Order Number", "Order Status", "Order Value", and "Order Details_Array", respectively, and appends these element names (as well as the service name "GetOrder_websrv") with documentation corresponding to the retrieved narrative information. The embellished output file thereby includes elements from the input file that are modified to include the narrative information provided by the retrieved cross-reference data, while maintaining the integrity (e.g., type, order, structure) of the input file.

Figure 6A:
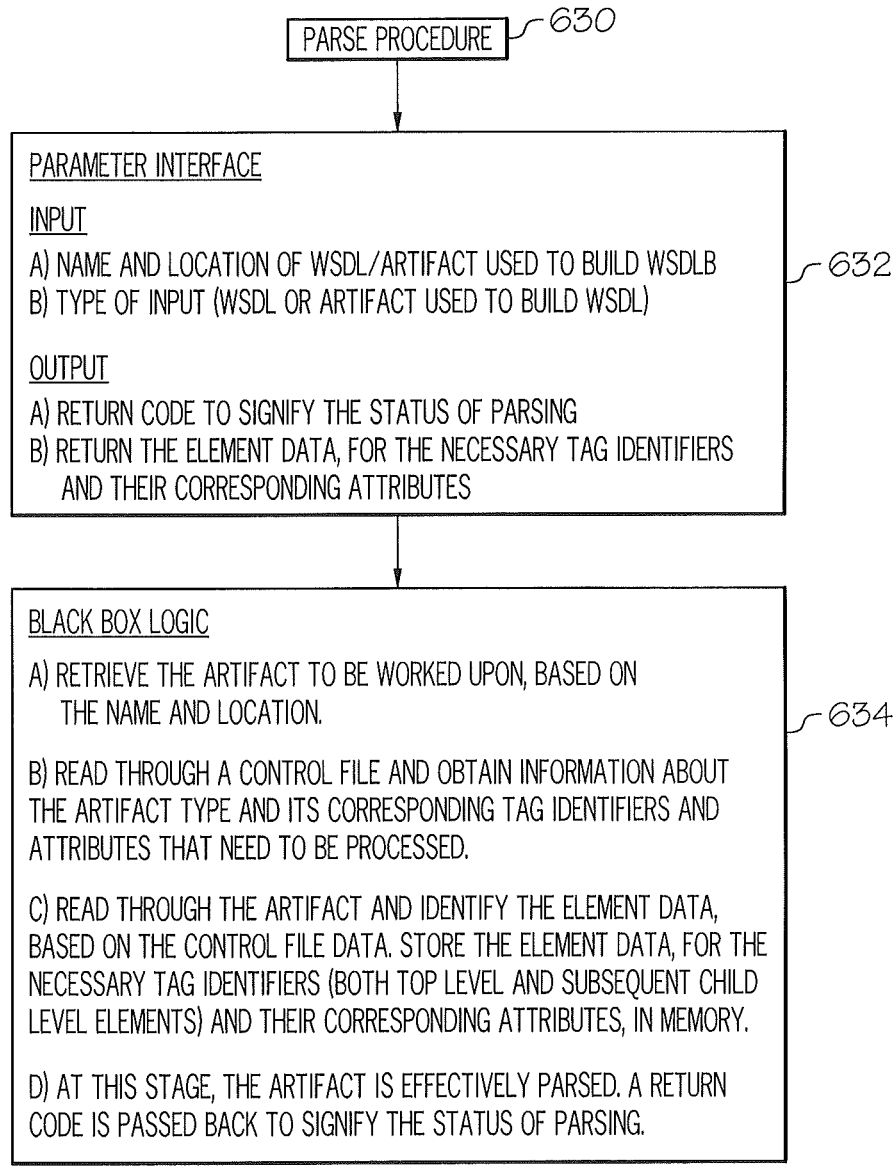
Figure 6B:
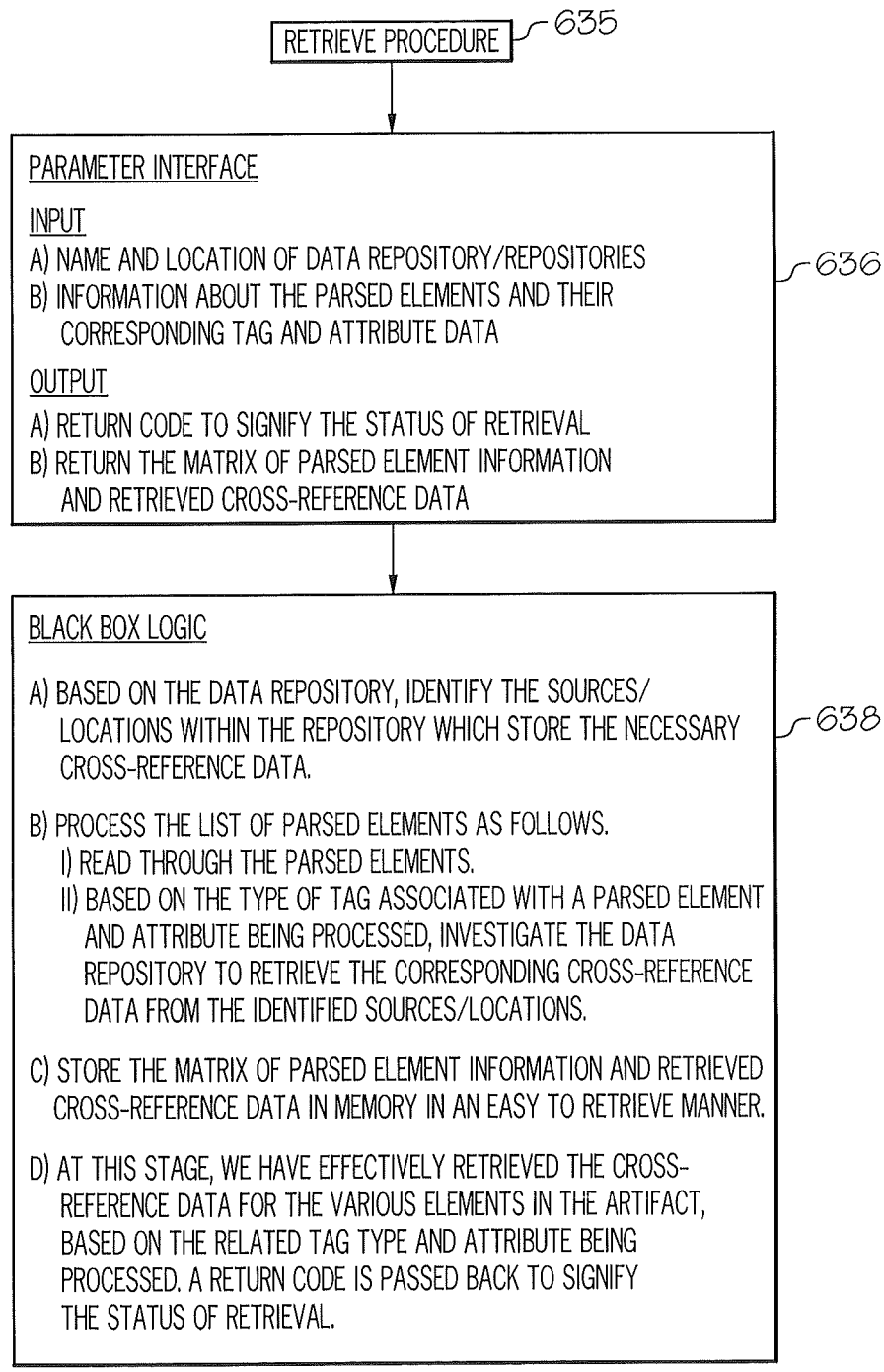
Figure 6C:
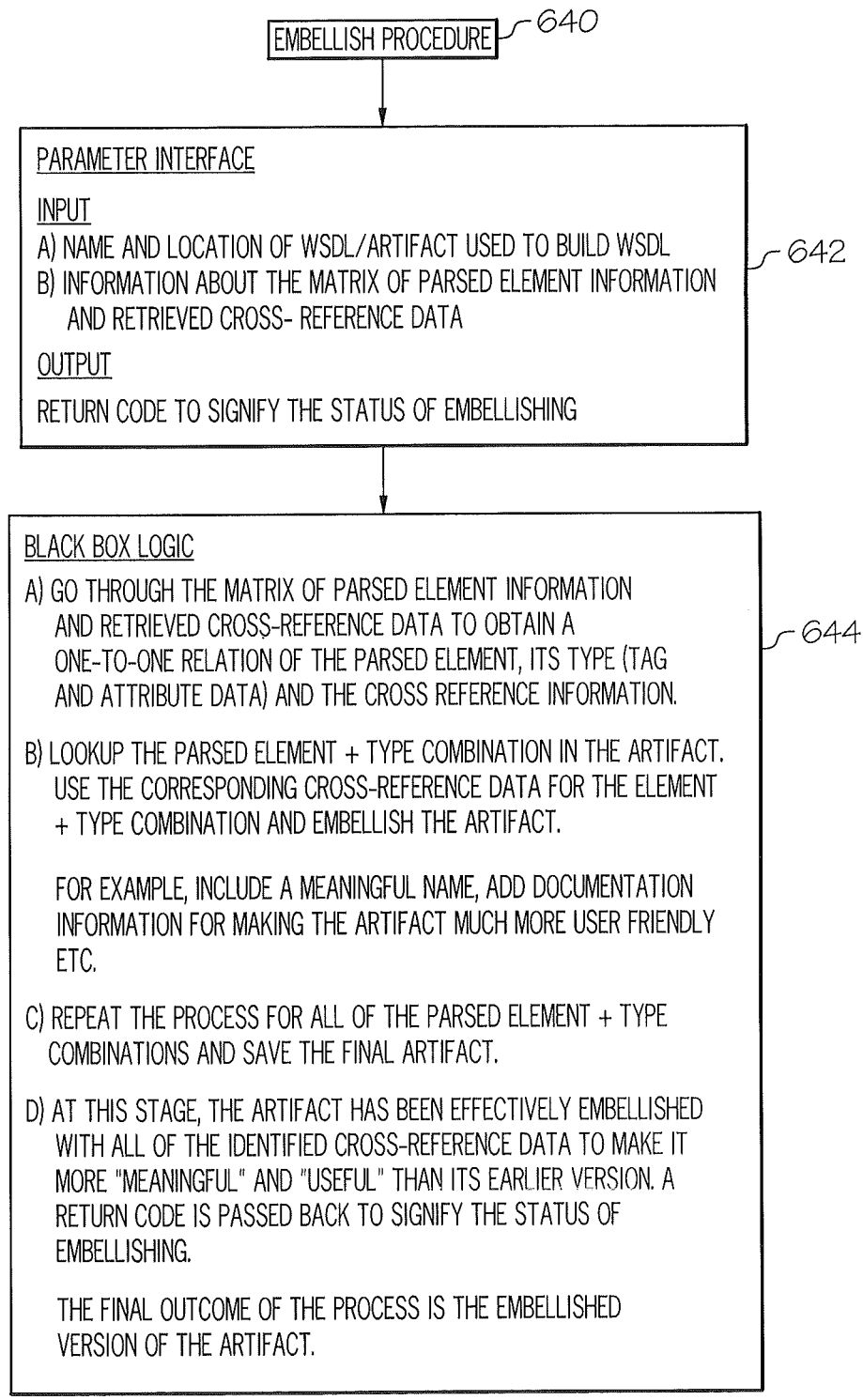

FIGS. 6A-C are flowcharts illustrating more detailed operations performed in implementing the parsing, retrieving, and embellishing processes in accordance with embodiments of the present disclosure. In particular, FIGS. 6A-C illustrate the parameter interface and logic of these three processes. In some embodiments, the parsing, retrieving, and embellishing processes may be performed by the parsing module 330, retrieving module 335, and embellishing module 340 of FIG. 3, respectively.

Referring now to FIG. 6A, a parsing process 630 receives, as inputs, a name and location of a WSDL file (and/or of an artifact used to build the WSDL file), and the type (e.g., WSDL file or artifact) corresponding to the input, as shown in block 632. In response, the parsing process 630 performs the following operations: retrieve the file/artifact to be embellished (based on the name and location); read a control file and obtain information about the file/artifact type and its corresponding tag identifiers and attributes to be processed; read the file/artifact and identify the element(s) based on the control file data and store the element data for the corresponding tag identifiers (both top-level and subsequent child level elements) and the corresponding attributes in memory; and pass back a return code to indicate the status of the parsing, as shown in block 634. The parsing process 630 thereby outputs the return code indicating the status of the parsing, and the element data for the corresponding tag identifiers and the corresponding attributes, as shown in block 632.

As shown in FIG. 6B, a retrieving process 635 receives, as inputs, the name and location of one or more data repositories, and information about the parsed elements and the corresponding tag and attribute data, as shown in block 636. The name and location of data repositories may be provided by a user/client, a service provider/server, and/or other network element(s). The data repositories may include any information sources, such as those discussed above, from which cross-reference data for the parsed elements can be retrieved. In response, the retrieving process 635 performs the following operations: identify the sources/locations within the input data repositories which store the desired cross-reference data; process the list of parsed elements by reading through the parsed elements and investigating the data repositories to retrieve the corresponding cross-reference data including narrative information for the elements (based on the type of tag associated with a parsed elements and/or attribute being processed); store the parsed element information and retrieved cross-reference data in memory in a manner suitable for retrieval (such as in a matrix or array); and pass back a return code to signify the status of retrieval for the various elements in the WSDL file/artifact thereof, as shown in block 638. The retrieving process 635 thereby outputs the return code to signify the status of the retrieval, and a matrix or array that relates the parsed element information to the retrieved cross-reference data. The retrieving process 635 may also be repeated responsive to detecting or identifying changes in the data repositories, including updates and/or newly-added repositories.

Referring to FIG. 6C, an embellishing process 640 receives, as inputs, the name and location of the WSDL file/artifact, and information about the matrix/array of parsed element information and retrieved cross-reference data, as shown at block 642. In response, the embellishing process 640 performs the following operations: analyze the matrix/array of parsed element information and retrieved cross-reference data to obtain a one-to-one relation of a parsed element, its type (tag and attribute data), and its corresponding cross-reference data; lookup the parsed element and type combination in the file/artifact; embellish the file/artifact using the corresponding cross-reference data for the element and type combination (for example, by replacing an element name/character string with a meaningful name and/or adding narrative documentation information in a human-readable format to make the file/artifact more understandable to a user); and repeating the analyze, lookup, and embellish operations for each remaining parsed element and type combination to generate an embellished output WSDL file/artifact, as shown in block 644. The embellishing process 640 thereby outputs return code to signify the status of the embellishing, and the embellished output file whereby the input file/artifact has been effectively embellished with the retrieved cross-reference data including narrative information corresponding to each identified element thereof.

Embodiments of the present disclosure are described below with reference to the following example, in which an identified element includes a six-character implementation name "ORDSTS" of a field in an Report Program Generator (RPG) program. The model-based application development tool, which generated the program, stores additional information about the field as "Order Status", in addition to information on allowable values for the field. Conventionally, a WSDL file may be automatically generated based on the RPG program source, and thus the six-character implementation would be passed through and included in the WSDL file as "ORDSTS," which does not have a meaning in a human-readable format that may be understood by the web service client developer:

<xs:complexType name="TestOperation">
<xs:sequence>
<xs:element minOccurs="0" name="ORDSTS" nillable="true"
type="xs:string"/>
</xs:sequence>
</xs:complexType>

In contrast, according to some embodiments of the present disclosure, an input WSDL file/artifact can be analyzed and the name "ORDSTS" can be cross-referenced with the additional information stored in the model-based application development tool, to determine and retrieve narrative information in the form of a more meaningful element name and/or additional documentation. Thus for the above example, the WSDL file can be modified as follows.

<xs:complexType name="TestOperation">
<xs:sequence>
<xs:element minOccurs="0" name="Order_Status" nillable="true"
type="xs:string"/>

<wsdl:documentation>"X"=Cancelled, "C"=Completed, "E"=Error and "O"=Open. </wsdl:documentation>
</xs:sequence>
</xs:complexType>

In some embodiments, some or all of the functionality described herein may be implemented into a command for extracting, modifying and writing the updated web service description information to a file or artifact. As such, the functionality described herein can be implemented as a standalone command, or in combination with another command, such as a create web service (YCRTWS) command, to install a web service with a modified parameter set. Also, a user/developer can decide on whether or not to use the description embellishment operations described herein. For example, the existing YCRTWS command may be modified to include the processing for YPRCPCML, and may provide the user with a choice to opt for meaningful names for the elements. Coding for the embodiments described herein may comply with any operating system (OS) version requirements to be able to use Web Services support.

In some embodiments relating to particular operating systems, business logic may be included in a "procedure," one or more procedures may be bundled into a "module," and one or more modules can be bundled up into a "service program." A service program can be deployed as a web service, and each of the procedures can be a candidate as a web service operation. The modules described herein may not be of direct relevance for WSDL, but may be used when an artifact (such as PCML file) is used to create a WSDL file. In PCML, multiple modules may be defined, each of which is created subsequently as a separate Service in the final WSDL file.

In some embodiments, when a module (*MODULE) object is created, the parameter interface information can be either embedded into the *MODULE object (in the form of PCML information) or created as a standalone .PCML file. In the event of the PCML information being embedded in the *MODULE object, it can be "extracted" using API's (such as IBM's API QBNRPII) and formatted into a standalone PCML file, also referred to herein as extracted PCML information. This PCML file, thus extracted, may contain information about the parameter interface, in the form of tags/elements. This PCML file can be subsequently processed using the embellishment operations described herein. When updating certain artifacts, e.g. PCML files, the <documentation> tag may not be created (since it is supported by WSDL, but not PCML). But an artifact, e.g. a PCML file, can still be embellished in accordance with the embodiments describe herein by using more meaningful names of the represented modules.

In some embodiments, an OS may specify a maximum element size limit. For example, when running the V5R4 OS, the maximum element size limit may be 64 KB. Accordingly, when a service program (*SRVPGM) includes multiple bound modules (*MODULES), each *MODULE (an EEF function) has 9 parameters, and each has a large number of subfields, the extracted PCML information array can exceed the 64 KB limit. In greater detail, a *SRVPGM (which may be similar to Windows .DLL) can have many *MODULE objects bound to it, where each of the *MODULE objects can expose one or more functionalities. Each of the *MODULE objects may its individual PCML information embedded in itself. When the various *MODULE objects are bound to a *SRVPGM and it is attempted to expose the *SRVPGM as a Web Service, then the subsequent PCML that is extracted from the *SRVPGM object may include information about the individual PCML information of the various bound *MODULES. To utilize memory in a more optimum manner and/or to ensure that the processing is carried out in a user-friendly and efficient manner, the PCML from the *SRVPGM can be processed to individually take up the PCML information of individual modules, process them and proceed to the next one. As such, some embodiments of the present disclosure may allow for processing module-by-module, to reduce the likelihood of exceeding a maximum element size limit.

However, while described herein by way of example, it will be understood that embodiments of the present invention are in no way limited to particular operating systems, service programs (e.g., *SRVPGM), and/or modules (e.g., *MODULE).

In some embodiments, the parsing, retrieving, and/or embellishing operations described herein may be performed in multiple levels. For example, if the extracted PCML information is written into a file, it can involve a large number of I/O's on the file, for example, to write the extracted PCML, read the PCML, modify the PCML, and then write the updated data to an integrated file system (IFS) file. As such, the extracted PCML information may be stored in the memory using arrays or other data structures, which may reduce the number of input/output (I/O) operations. In particular, the logic flow for extracting, modifying, and creating an embellished .pcml file may be as follows. The PCML file/information for a particular service program (or module thereof) may be retrieved using an application program interface (API). In some embodiments, the service program may include a plurality of modules, 1 to N. For each module (1 to N): the PCML file/information may be obtained for the current module; the retrieved PCML file/information may be parsed to identify elements thereof and the identified elements may be stored an array; narrative information for the current module may be retrieved and stored in arrays; the PCML element array may be read and referenced against the stored narrative information array to obtain replacement names for the elements of the PCML file/information; the elements in the PCML element array may be replaced with the obtained replacement names; and the embellished PCML elements may be written into the IFS file using the IFS APIs and the corresponding code page (for example, page 819).

In some embodiments, multiple field information for a particular surrogate may be extracted from the YMSGPAR/YMSGPDT files with as few file I/O's as possible.

In some embodiments of the present disclosure, the tags for the elements may not be language dependent. Also, there may be no limitation on the attribute value sizes and/or on the maximum size of a single element in a file/artifact (such as a WSDL file/PCML file) or size of PCML file on the IFS.

In some embodiments, the same element or parameter in a web service description file may be defined multiple times. For example, multiple instances of a particular element type may be defined as P1PARM, P2PARM etc. As such, some embodiments of the present disclosure may tag each element/parameter (not the subfield) with a different parameter number, and the embellishment operations described herein may replace each of the multiple instances with a different name (rather than the same name).

A standard for storing the embellished output file generated in accordance with embodiments of the present disclosure may be determined based on the path where the embellished output file is to be placed, the naming convention to be followed for this embellished output file, and/or whether the embellished output file is to be retained.

Some embodiments may also include options to control a naming format when obtaining the meaningful name (for example, by incorporating a model value), obtain surrogate numbers at the end of meaningful names where special characters (e.g., #, %, etc.) are replaced, incorporate logging into the programs, and/or restrict the number of parameters being displayed to be limited to the number of active elements.

Embodiments of the present disclosure may thus mitigate or preclude the additional investigative work by a web service client developer to determine the purpose of elements or operations in a web services interface description (such as a WSDL file or artifact used to generate the WSDL file), by automatically or programmatically generating a web service description that contains rich narrative information as to the purpose of elements and/or operations in a human-readable format. Although described herein primarily with reference to PCML files as artifacts, it will be understood that embodiments of the present disclosure are not limited thereto, and may be used to embellish other types of artifacts (for example, other XML type structures) in a similar manner. In other words, embodiments of the present disclosure can be used to embellish one or more (e.g., multiple) artifacts, and/or file(s) (such as a WSDL file) generated using such artifact(s). Operations as described herein may also be repeated to generate updated web service interface descriptions, for example, in response to detecting changed (including updated and/or newly-created) external information sources. Also, while described herein with reference to particular external information sources by way of example, embodiments of the present disclosure are not limited thereto, and can access or cross-reference any known sources (such as Word documents, Excel documents, and/or other documents/databases) to obtain the narrative information.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of any means or step plus function elements in the claims below are intended to include any disclosed structure, material, or act for performing the function in combination with other claimed elements as specifically claimed.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method for generating narrative interface descriptions, the method comprising:
   parsing, by a processor, a web service description file to identify an element therein based on a property of the element, wherein the web service description file is provided by a web service provider, wherein the web service description file comprises a machine-readable description of a computing interface, and wherein the machine-readable description comprises a plurality of elements including the element and a string of characters identifying the element that is meaningless in a human-readable format;
   retrieving, by the processor and from a data source, cross-reference data comprising human-readable narrative information corresponding to the element, wherein the human-readable narrative information provides descriptive information about the element in the human-readable format;
   generating, by the processor, an embellished web service description file wherein the element is modified to include the cross-reference data, wherein the generating the embellished web service description file comprises modifying content of the element to include the human-readable narrative information while retaining a structure of the machine-readable description;
   identifying, by the processor, a change to the data source wherein the human-readable narrative information is updated, resulting in updated human-readable narrative information;
   retrieving, by the processor, the updated human-readable narrative information; and
   re-generating, by the processor, the embellished web service description file wherein the element is modified to include the updated human-readable narrative information.

2. The method of claim 1, wherein the element comprises content and markup information, wherein the property is indicated by the markup information, and wherein the content is modified to include the cross-reference data in the embellished web service description file.

3. The method of claim 2, wherein the retrieving the cross-reference data comprises:
   receiving an identification of the data source, wherein the data source is external to a computing device including the processor therein; and
   retrieving the cross-reference data from the data source based on the property indicated by the markup information for the element responsive to receiving the identification of the data source.

4. The method of claim 3, wherein the parsing comprises:
   accessing a control file for the computing interface, the control file comprising the markup information stored therein; and
   identifying the element based on the property indicated by the markup information stored in the control file.

5. The method of claim 1, wherein:
   the parsing comprises identifying multiple elements of the plurality of elements in the machine-readable description of the computing interface based on respective properties of each of the multiple elements and storing the multiple elements in a first data structure;
   the retrieving comprises retrieving respective cross-reference data comprising human-readable narrative information corresponding to each of the multiple elements and storing the respective cross-reference data in a second data structure; and
   the generating comprises:
      cross-referencing the first data structure with the second data structure to determine a one-to-one relation between the multiple elements of the first data structure and the respective cross-reference data of the second data structure based on the respective properties of the multiple elements; and
      modifying each of the multiple elements to include the respective human-readable narrative information based on the one-to-one relation.

6. The method of claim 1, wherein the web service description file comprises a Web Services Description Language (WSDL) file comprising a plurality of network endpoints that define a web service.

7. The method of claim 6, wherein the web service description file comprises an artifact of the WSDL file corresponding to one of a plurality of operations of the web service, and wherein parsing, retrieving, and generating are performed for each of the plurality of operations of the web service.

8. A computer program product for generating narrative interface descriptions, comprising:
   a non-transitory computer readable storage medium having computer readable program code embodied in the medium, the computer readable program code comprising:
      computer readable program code to parse a web service description file to identify an element therein based on a property of the element, wherein the web service description file is provided by a web service provider, wherein the web service description file comprises a machine-readable description of a computing interface, and wherein the machine-readable description comprises a plurality of elements including the element and a string of characters identifying the element that is meaningless in a human-readable format;
      computer readable program code to retrieve, from a data source, cross-reference data comprising human-readable narrative information corresponding to the element, wherein the human-readable narrative information provides descriptive information about the element in the human-readable format; and
      computer readable program code to generate an embellished web service description file wherein the element is modified to include the human-readable narrative information while a structure of the machine-readable description is maintained.

9. The computer program product of claim 8, further comprising:

computer readable program code to identify a change to the data source wherein the human-readable narrative information is updated; and computer readable program code to re-execute the computer readable program code to retrieve the updated human-readable narrative information and the computer readable program code to generate the embellished web service description file responsive to identification of the change to the data source.

10. The computer program product of claim 8, wherein the element comprises content and markup information, wherein the property is indicated by the markup information, and wherein the content is modified to include the human-readable narrative information in the embellished web service description file.

11. The computer program product of claim 10, wherein the computer readable program code to retrieve comprises:

computer readable program code to receive an identification of the data source, wherein the data source is an external data source; and computer readable program code to retrieve the cross-reference data from the external data source based on the property indicated by the markup information for the element responsive to receipt of the identification of the data source.

12. The computer program product of claim 11, wherein the computer readable program code to parse comprises:

computer readable program code to access a control file for the computing interface, the control file comprising the markup information stored therein; and computer readable program code to identify the element based on the property indicated by the markup information stored in the control file.

13. The computer program product of claim 10, wherein the computer readable program code to generate the embellished web service description file comprises:

computer readable program code to modify the content of the element to include the human-readable narrative information while retaining a structure of the machine-readable description.

14. The computer program product of claim 8, wherein:

the computer readable program code to parse comprises computer readable program code to identify multiple elements of the plurality of elements in the machine-readable description of the computing interface based on respective properties of each of the multiple elements and store the multiple elements in a first data structure;

the computer readable program code to retrieve comprises computer readable program code to retrieve respective cross-reference data comprising human-readable narrative information corresponding to each of the multiple elements and store the respective cross-reference data in a second data structure; and the computer readable program code to generate comprises:

computer readable program code to cross-reference the first data structure with the second data structure to determine a one-to-one relation between the multiple elements of the first data structure and the respective cross-reference data of the second data structure based on the respective properties of the multiple elements; and computer readable program code to modify each of the multiple elements to include the respective human-readable narrative information based on the one-to-one relation.

15. The computer program product of claim 8, wherein the web service description file comprises an artifact corresponding to one of a plurality of operations of a web service, and further comprising:

computer readable program code to execute the computer readable program code to parse, the computer readable program code to retrieve, and the computer readable program code to generate for each of the plurality of operations of the web service.

16. A computer system for generating narrative interface descriptions, comprising:

a processor; and a memory coupled to the processor, the memory comprising computer readable program code embodied therein that, when executed by the processor, causes the processor to:

parse a file comprising a machine-readable description of a computing interface to identify an element therein based on a property of the element, wherein the machine-readable description comprises a plurality of elements including the element and a string of characters identifying the element that is meaningless in a human-readable format;

retrieve, from a data source, cross-reference data comprising human-readable narrative information corresponding to the element, wherein the human-readable narrative information provides descriptive information about the element in the human-readable format; and generate an embellished file in which the element is modified to include the human-readable narrative information, wherein the element comprises content and markup information, wherein the property is indicated by the markup information, and wherein the content is modified to include the human-readable narrative information in the embellished file.

17. The computer system of claim 16, wherein the computer readable program code further causes the processor to:

identify a change to the data source wherein the human-readable narrative information is updated;

retrieve the updated human-readable narrative information from the data source responsive to identifying the change therein; and generate an updated embellished file wherein the element is further modified to include the updated human-readable narrative information.

18. The computer system of claim 16, wherein the computer readable program code further causes the processor to:

receive an identification of the data source, wherein the data source is external to a computing device including the processor therein; and retrieve the cross-reference data from the data source based on the property indicated by the markup information for the element responsive to receipt of the identification of the data source.

19. The computer system of claim 18, wherein the computer readable program code further causes the processor to:

access a control file for the computing interface, the control file comprising the markup information stored therein; and identify the element based on the property indicated by the markup information stored in the control file.

20. The computer system of claim 16, wherein the computer readable program code further causes the processor to:

modify the content of the element to include the human-readable narrative information while retaining a structure of the machine-readable description in the embellished file.

\* \* \* \* \*